(12) United States Patent
Kutsuwada

(10) Patent No.: US 6,226,473 B1
(45) Date of Patent: May 1, 2001

(54) COPYING APPARATUS FOR DISCHARGING RECORDING SHEET FACE-UP OR FACE-DOWN

(75) Inventor: Satoru Kutsuwada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/257,524

(22) Filed: Feb. 25, 1999

(30) Foreign Application Priority Data

Mar. 4, 1998 (JP) .................................................. 10-051952

(51) Int. Cl.$^7$ .................................................. G03G 15/00
(52) U.S. Cl. .................. 399/82; 271/186; 271/225; 399/81; 399/365
(58) Field of Search .................. 399/364, 374, 399/365, 82, 81; 271/225, 902, 186

(56) References Cited

U.S. PATENT DOCUMENTS

| | | | |
|---|---|---|---|
| 4,169,674 | * 10/1979 | Russel | 399/364 |
| 4,184,671 | * 1/1980 | Sasamori | 399/374 X |
| 4,456,236 | * 6/1984 | Buddendeck | 399/374 X |
| 5,347,351 | * 9/1994 | Morita et al. | 399/82 |
| 5,463,457 | * 10/1995 | Takeuchi et al. | 399/364 X |
| 5,517,295 | 5/1996 | Kaneko et al. | |
| 5,592,280 | 1/1997 | Ishizuka et al. | 399/410 |
| 5,689,759 | 11/1997 | Isemura et al. | 399/45 |
| 5,745,661 | 4/1998 | Koh et al. | 399/19 X |
| 5,839,032 | * 11/1998 | Yasui et al. | 399/364 X |
| 6,073,927 | * 6/2000 | Sako et al. | 271/186 X |
| B1 6,181,894 | * 1/2001 | Kaneko et al. | 399/82 |

FOREIGN PATENT DOCUMENTS

| 62-175346 | * 8/1987 | (JP) . |
|---|---|---|
| 62-175349 | * 8/1987 | (JP) . |
| 9/104143 | * 4/1997 | (JP) . |

* cited by examiner

Primary Examiner—Susan S. Y. Lee
(74) Attorney, Agent, or Firm—Fitzpatrick, Cella, Harper & Scinto (57) ABSTRACT

In response to the setting of a first face-down mode on an operation panel, a topside pickup roller picks up documents stacked face-up in a document tray to bring the document to a document platen. In response to the setting of face-up mode on the operation panel, a bottom-side pickup semi-circular roller picks up documents stacked face-up in the document tray to bring the document to the document platen. A copying operation is now performed. In a single-side mode, recording sheets are inverted through a inverter path and then discharged in the face-down mode. Depending on the user's preference, the recording sheets are discharged face-down or face-up. In either discharge mode, the order of pages of copied recording sheets is not reversed.

16 Claims, 5 Drawing Sheets

COPYING APPARATUS FOR DISCHARGING RECORDING SHEET FACE-UP OR FACE-DOWN

BACKGROUND OF THE INVENTION

1. Field of the Invention

The present invention relates to a copying apparatus having means for discharging recording sheets face-up or face-down.

2. Description of the Related Art

Conventional copying machines photocopy a stack of document sheets placed face-up in a document tray from a bottom one first, and then deliver a finished recording paper face-up.

Copying machines that also print out image data from a host computer are available today. This type of copying machine discharges a recording sheet face-down since a host computer outputs image data, first page first, in the order of pages.

Since the copying machines of the second type discharge recording papers face-down even in its copying function, these machines inconvenience the user because the user needs to turn the finished recording sheet face-up to check the quality of copy. However, the face-up delivery is not always acceptable during the copying function. In an N-in-1 mode in which a plurality of documents are copied on a single recording paper, documents are fed the final page first, and the recording paper is delivered face-up. A blank area results ahead of the first page if the number of original documents is unknown. If the original documents are fed the first page first, and if the finished recording papers are discharged face-down, the N-in-1 mode is performed with the first page appearing first without a blank area. The face-down and face-up discharges have these advantages and disadvantages.

SUMMARY OF THE INVENTION

It is an object of the present invention to provide a copying machine that is free from the above problem.

It is another object of the present invention to provide a copying machine that performs copying in the correct order of pages when the user selects between a face-down delivery and a face-up discharge.

In accordance with these objects, there is provided a copying apparatus having first document feeding means for feeding a plurality of original documents stacked on a document tray to a document platen, one by one sequentially, the first page first, and a second document feeding means for feeding a plurality of original documents stacked on the document tray to the document platen, one by one, in the reverse order of the pages, the last page first. Copying means copy the original fed to the document platen onto a recording sheet and a first setting means is provided for setting one of a face down mode in which the recording sheet is discharged in a face-down orientation and a face-up mode in which the recording sheet is discharged in a faced-up orientation, a control means being provided for controlling the first document feeding means and the second document feeding means in accordance with the mode set by the first setting means.

In accordance with yet another aspect of the present invention, there is provided a control method for controlling a copying apparatus of the above type, the control method comprising the steps of determining which of the face-down or the face-up modes is set and feeding the original document in accordance with the determined mode.

In accordance with yet another aspect of the present invention, there is provided a copying machine comprising copying means for copying an original document onto a recording sheet, topside - bottomside inverting means for inverting, the topside down, the recording sheet copied by the copying means and an operation panel for setting either a mode in which the recording sheet is discharged face-down or a mode in which the recording sheet is discharged faced-up.

These and other objects and features will become apparent from the following description and drawings.

DESCRIPTION OF THE PREFERRED EMBODIMENTS

Figure 1:
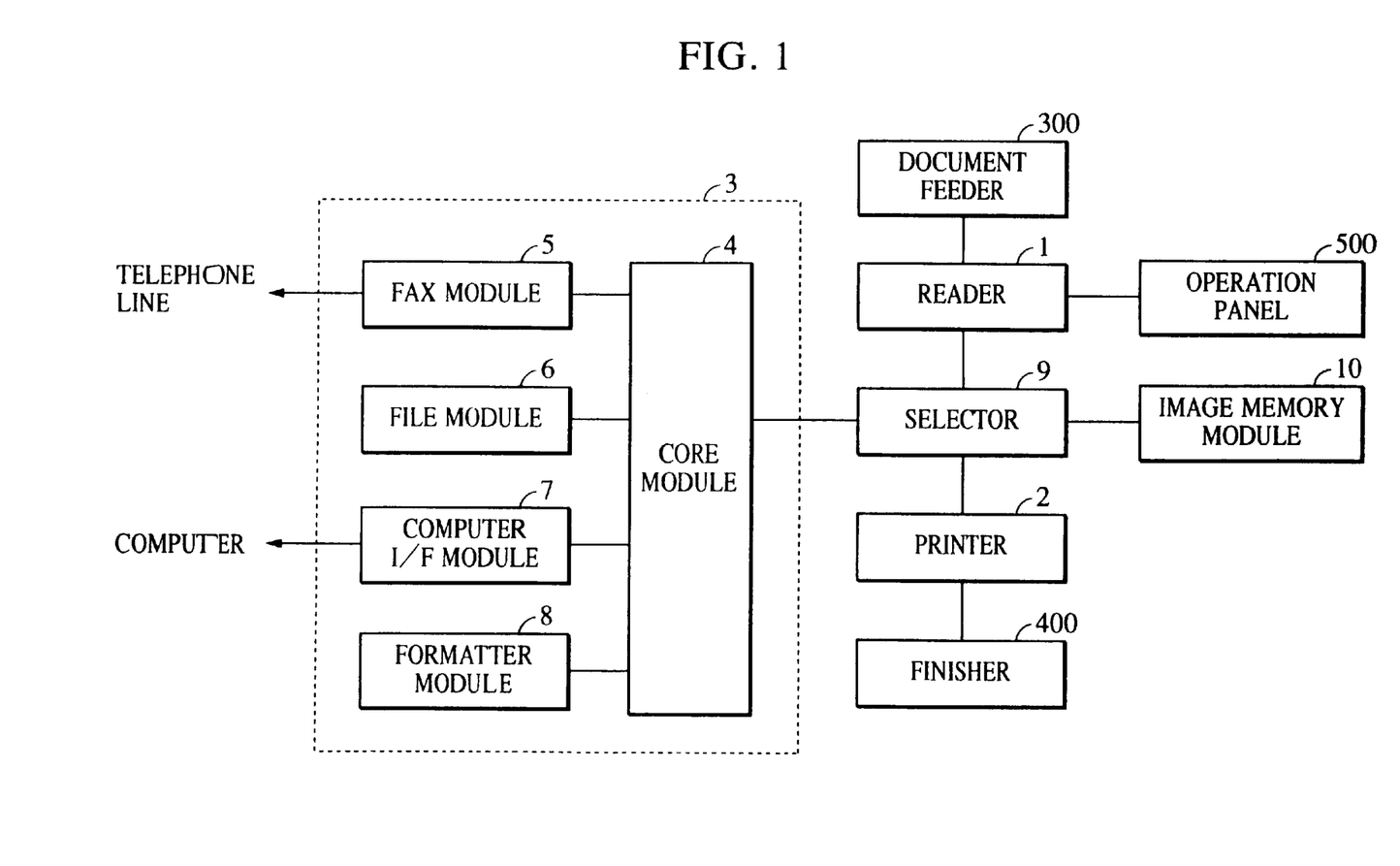
FIG. 1 is a block diagram showing generally an image forming apparatus of one embodiment of the present invention.

FIG. 1 is a block diagram showing an image forming apparatus of one embodiment of the present invention. There are shown a reader 1 for reading an original and converting it into image data, a printer 2 for outputting the image data in the form of an visible image on a recording paper in response to a print command, and an external apparatus 3 electrically connected to the reader 1. The external apparatus 3 includes a facsimile module 5, a file module 6, a computer interface module 7 for connection with a computer or LAN, a formatter module 8 for converting information from the computer into a visible image, and a core module 4 that includes memory for storing image data from the reader 1 and for storing temporarily information sent from the computer. The core module 4 also controls the functions of the modules of the external apparatus 3.

An image memory module 10 temporarily stores an image from the reader 1. The image memory module 10 detects a connect status based on an unshown connect signal indicative of the connect status. A selector 9 modifies image data bus by selecting one from the input from the reader 1, the input and output to and from the core module 4, and the input and output to and from the image memory module 10.

Figure 2:
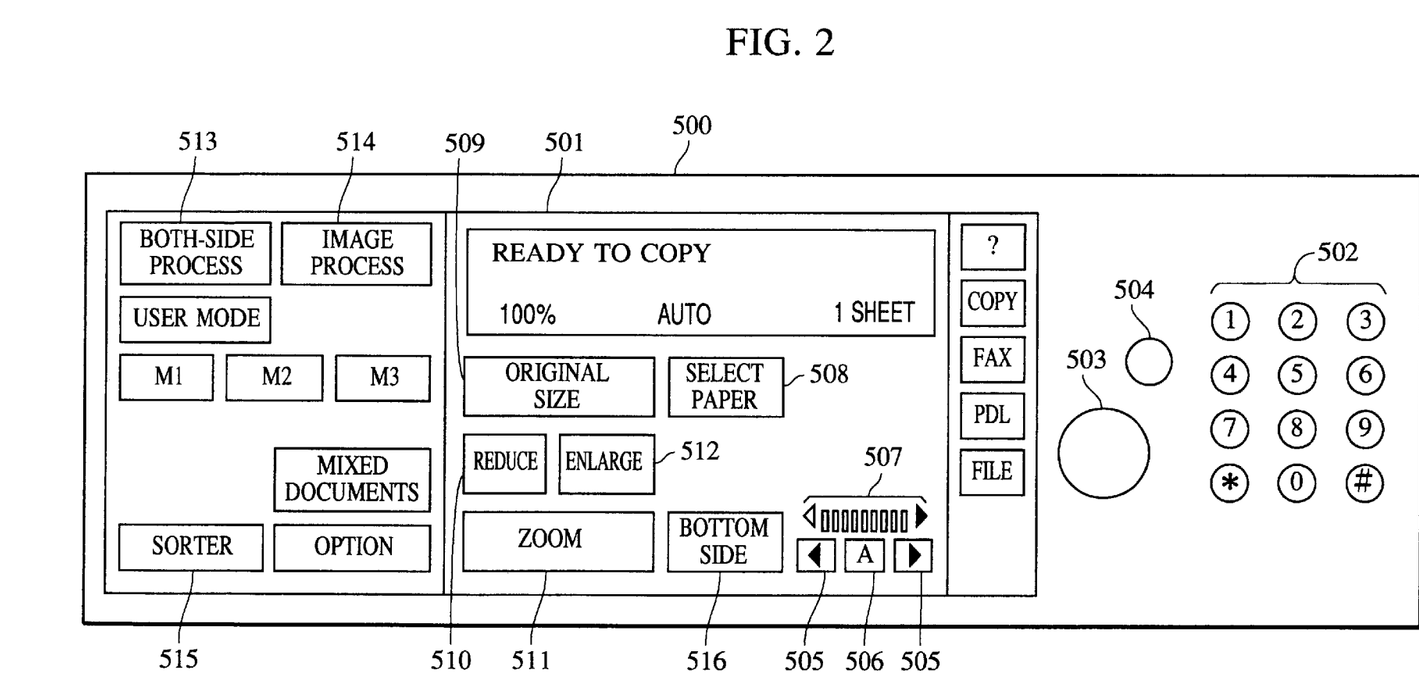
FIG. 2 shows an operation panel of the image forming apparatus.

FIG. 2 shows a detail of an operation panel 500 of the image forming apparatus. As shown, the operation panel 500 provides a variety of keys, and a LCD display 501 composed of dot matrix. Touch sensors are provided on the display 501. When a finger touches any operation key presented on the display 501, the corresponding touch sensor senses the finger touch. The display 501 displays the status of the image forming apparatus, the number of copies, magnification, selected paper and a variety of operational screens.

A start key 503 starts photocopying. A default key 504 makes a set mode default to a standard state. A key group 502 includes numeric keys from 0 to 9 for inputting the number of copies, a zoom magnification, or the like and a clear key to clear such input. Density keys 505 raise or lower the density level of photocopy. The density level set is shown on an indicator 507. A key 506 switches on and off an automatic density setting. A key 508 selects paper feed stack and automatic paper selection. Keys 509, 510, and 512 select the original size, and reduce/enlarge settings. A key 514 sets image processing mode.

A key 513 sets both-side copying. A key 516 switches between a face-down discharge (bottom side delivery) and a face-up discharge (top side delivery) in the printing. Each pressing of the key 516 causes the "bottom side" and the "top side" to be alternately displayed, with the non-displayed side set (when the bottom side is indicated, the top side (face-up) delivery is set). The face-down delivery is suited to the N-in-1 mode in which a plurality of originals are copied on a single recording paper. The face-up discharge is useful for checking the quality of copying of recording papers.

Figure 3:
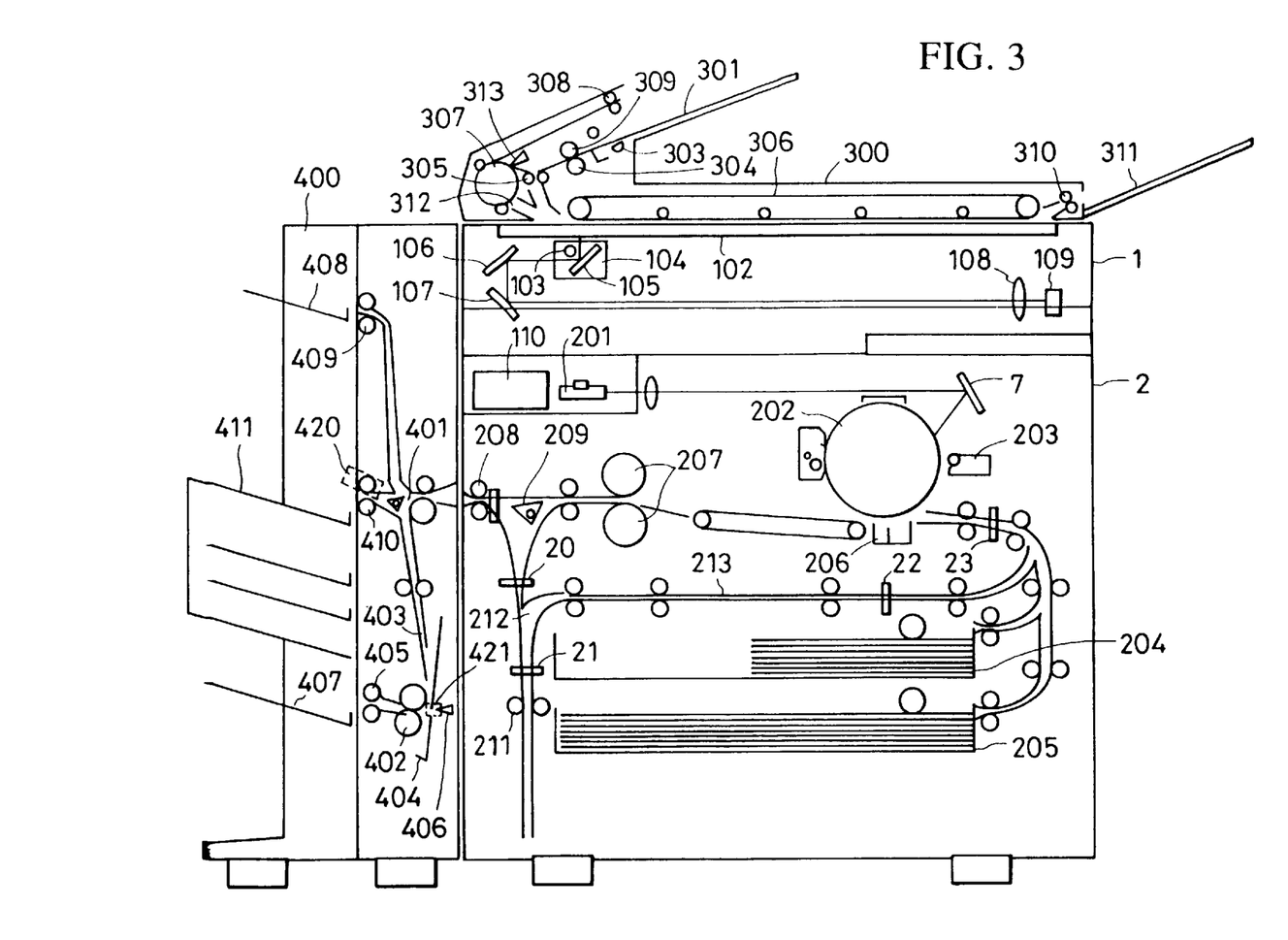
FIG. 3 is a vertical section showing a reader, a printer, a document feeder and a finisher.

FIG. 3 is a vertical section showing the reader 1 and the printer 2 shown in FIG. 1. The construction and operation of these sections are now discussed.

(1) Original Document Feeding Operation

Original documents stacked on a document tray 301 in a document feeder 300 are fed, one by one, onto a document glass platen 102. The user places a stack of documents face-up (the top side of the document facing up) on the document tray 301. The document tray 301 is provided with edge guide plates (not shown) for guiding both edges of the documents so that the original documents may not be skewed when being fed. The edge guide plates are slidable in a direction perpendicular to the moving direction of the documents.

Discussed next is how the document feeder 300 brings the first page (the topmost page) from a stack of documents to the document glass platen 102. This pickup and feed method is now called top pickup. Using a pickup roller 309 and a separation roller 304, a stack of documents are picked up one by one from the topmost one first, and a picked document is brought to an exposure position on the document platen glass 102 by a transport roller 305 and a flat-face belt 306. The image reading now starts. Subsequent to the image reading, the document on the document platen glass 102 is transported in the same direction as in the feeding step, by the flat-face belt 306, and is then delivered face-down onto a delivery tray 311 by the delivery roller 310.

Discussed next is how the final page (the bottommost page) from a stack of documents is brought to the document platen glass 102. This pickup and feed method is now called bottom pickup. A semi-circular roller 303 and the separation roller 304 are used to pick up a stack of documents one by one from the bottom one first. A picked document is brought to the exposure position on the document platen glass 102 by the transport roller 305 and the flat-face belt 306. The image reading now starts. Subsequent to the image reading, the document on the document platen glass 102 is now transported in the direction opposite to the direction of feeding, by the flat-face belt 306, and is routed to a both-side/delivery path 312. With a large-diameter transport roller 307 rotating, the document is delivered face-up into the document tray 301 by a document delivery roller 308.

For both-side documents, the document is once placed on the document platen glass 102, and subsequent to the image reading, the flat-face belt is moved in the direction opposite to the direction of feeding to transport the document to the large-diameter roller 307. A pivotable flapper 313 is pivoted upward. Using the transport roller 305 and the flat-face belt 306, the document is brought to the document platen glass 102. The rotation of the large-diameter roller 307 inverts the document topside down.

(2) Document Reading and Image Forming Operation

When the operation panel 500 arranged on the front of the image forming apparatus issues a copy start command, the already-described document feeding operation is performed if the documents are already placed on the document tray 301. Waiting until the document is set on the predetermined position on the document platen glass 102, the image forming apparatus moves a scanner unit 104 while allowing a lamp 103 to light the document. When the document is directly placed onto the predetermined position on the document platen glass 102, the image forming apparatus moves scanner unit 104 in response to a command from the operation panel 500 while allowing the lamp 103 to light the document. The light ray reflected from the document passes through mirrors 105, 106, and 107, and a lens 108 and enters a charge-coupled device (hereinafter CCD) 109.

CCD 109 receives the light ray reflected from the document, namely, reads the image of the document, and outputs the image information of the document to an image processor 110. The image processor 110 processes the image as set by the operation panel 500. The selector 9 selects image information, and sends it to the image memory module 10, the printer 2 and the external apparatus 3. The image information input to the printer 2 is modulated and converted by an exposure controller 201 into a light ray, which then irradiates a photoconductive body 202. A latent image formed on the photoconductive body 202 with the light ray is developed by a developer unit 203. In synchronization with the forward edge of the latent image, a recording paper is fed from a recording paper tray 204 or a recording paper tray 205. A transfer unit 206 transfers the developed image onto the recording paper.

(3) Discharge Status (face-up/face-down)

The transferred image is fixed onto the recording paper through a fixing unit 207. After that, the recording paper is discharged face-up through a discharge section 208 out of the image forming apparatus or is sent to an inverter path 212. When the backward edge of the recording paper goes past a sensor 20 in the inverter path 212, a flapper 209 transports the recording paper toward the discharge section 208, which then discharges it face-down out of the image forming apparatus. From the standpoint of page order, the face-up discharge is preferable when the last page is photocopied (imageformed) first, and the face-down discharge is preferable when the first page is photocopied (image-formed) first.

(4) Finishing Operation

The recording paper, discharged by the discharge section 208, enters a finisher 400. The finisher 400 includes a vertically movable three-bin tray 411, a tray 408 that is temporarily used when the tray 411 cannot be used, and a discharge tray 407 for pamphlet-type folding papers.

To deliver the recording paper into the movable three-bin tray 411, copied recording paper is sequentially discharged from a discharge roller 208, enters through transport rollers 401 of the finisher 400, and then is discharged into a predetermined bin of the tray 411 through a discharge roller 410. When a staple signal comes in from the printer with a staple mode selected, a staple unit 420 staples a stack of recording papers. The staple unit 420, driven by its staple drive motor (not shown), moves frontward and rearward so that the recording papers are stapled at any position.

When a recording paper for another process is output during the discharge operation to the three-bin tray, it goes past the transport rollers 401, enters a top path, and is delivered into the tray 408 by discharge rollers 409.

When a pamphlet-type folding paper is output, the recording paper is routed through a transport path 403, and abuts a stacking section 404. The stacking section automatically moves upward and downward in accordance with the sheet size. When a required number of recording papers are collected in the stacking section 404, a staple unit 421 operates in response to a pamphlet folding signal from the printer 2. The staple unit 421 performs a staple process on a stack of recording papers at their center. A folding section 406 pushes the stack of recording papers at its center between folding rollers 402, which then folds the recording papers in half. The finished recording papers are discharged by delivery rollers 405.

(5) Image Forming Operation

The recording paper, to which an image is fixed by the fixing unit 207, is routed to the inverter path 212 by the flapper 209. When a sensor 21 detects the pass of the backward edge of the recording paper, rollers 211 rotate in reverse to switch the direction of advance, transporting the recording paper to a recirculation section 213. When a next original document is prepared, it is read in the same way as already described. The recording paper is fed from the recirculation section 213 so that two images are copied respectively onto the top side and the bottom side of the recording paper.

(6) Mode-by-mode Control

Figure 4:
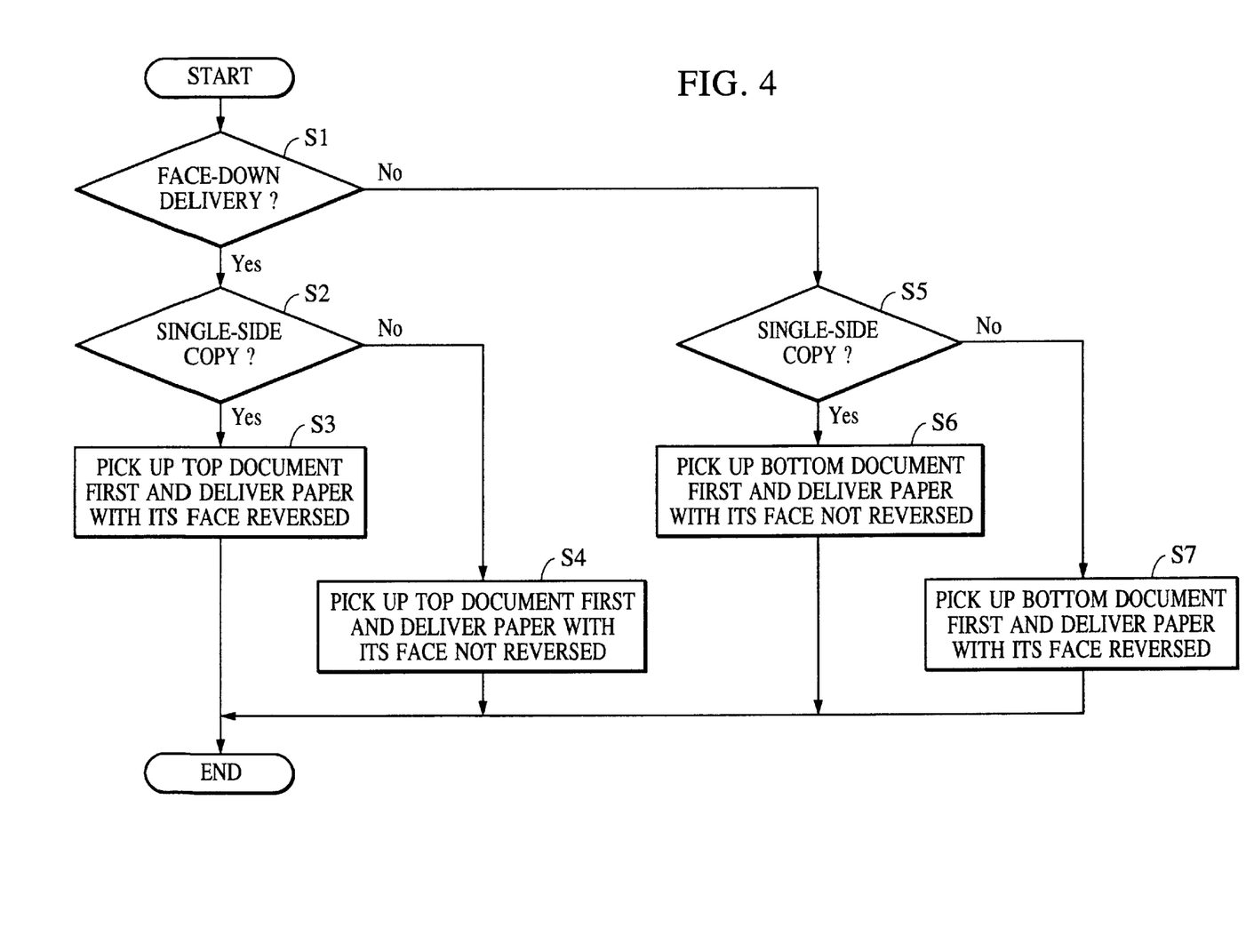
FIG. 4 is a control flow diagram of the image forming apparatus.

A document feed control and recording paper transport control depending on the mode set in the operation panel 500 are now discussed. FIG. 4 is a flow diagram of a control that is performed when the start key 503 is pressed on the operation panel 500 with a document placed on the document tray 301 in the document feeder 300. The control is executed by CPU in the reader 1. The detail of photocopying operation has been described, and is not repeated here.

Figure 5A:
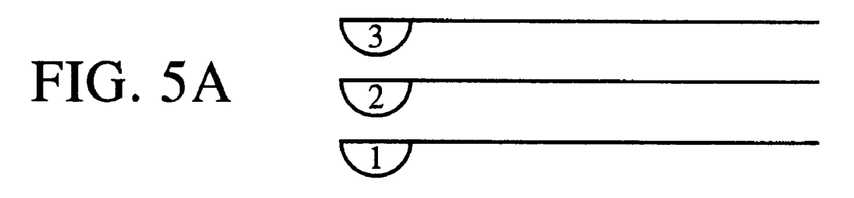
FIG. 5 shows the delivery state of recording paper in each mode.

CPU determines whether the key 516 on the operation panel 500 is set for a face-down discharge (bottom side delivery) (step SI). When the default setting is the face-down discharge mode, the CPU determines that the face-down discharge mode is set whenever the key 516 is not pressed. When CPU determines in step Si that the face-down mode is set, CPU then determines whether a single-side copy mode for copying on a single side of a recording paper is set (step S2). When CPU determines in step S2 that the single-side copy mode is set, CPU causes the document feeder 300 to perform the top pickup and single-side copying. The single-side copied recording paper is discharged through the inverter path 212 (step S3). Through this control, the recording papers are discharged face-down without being reversed in the page order as shown in FIG. 5A.

Figure 5B:
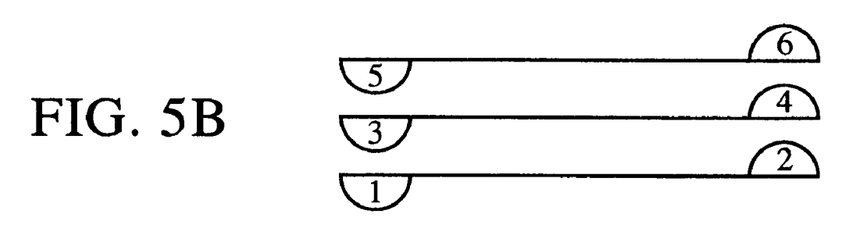

When it is determined in step S2 that the single-side copy mode is not set, namely, that both-side copy mode is set, CPU causes the document feeder 300 to perform the top pickup and both-side copying. The both-side copied recording paper is then discharged without going to the inverter path 212 and without being reversed in the page order (step S4) as shown in FIG. 5B.

Figure 5C:
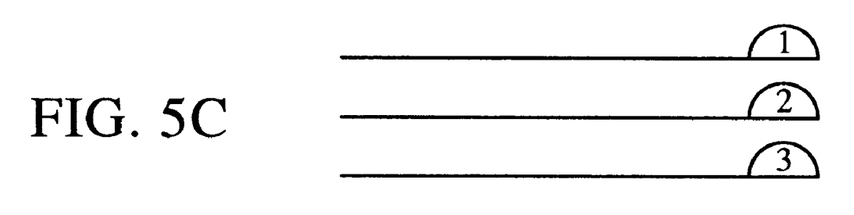

When it is determined in step Si that the face-down mode is not set, namely, that a face-up mode is set, CPU determines whether the single-side copy mode is set (step S5). When CPU determines in step S5 that the single-side mode is set, CPU causes the document feeder 300 to perform the bottom pickup and the single-side copying. The single-side copied recording paper is delivered without being sent to the inverter path 212 (step S6). Through this control, the recording papers are discharged face-up without being reversed in page order as shown in FIG. 5C.

Figure 5D:
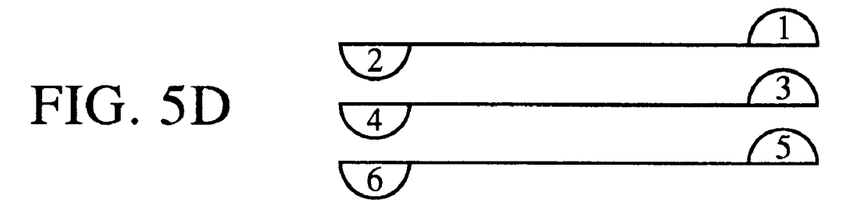

When it is determined in step S5 that the single-side copy mode is not set, namely, that the both-side copy mode is set, CPU causes the document feeder 300 to perform the bottom pickup and both-side copying. The both-side copied recording paper is discharged through the inverter path 212 (step S7). As shown in FIG. 5D, the recording papers are discharged without being reversed in the page order.

In this way, the image forming apparatus discharges the recording papers with the page order correctly maintained regardless of whether the user selects between the face-up discharge and the face-down discharge. Since the apparatus switches between the top pickup and the bottom pickup depending on whether the face-up discharge or the face-down discharge is selected, the recording papers are output in the correctly arranged page order without consuming a large image memory area for changing the page order of read documents.

The control program described above may be executed after reading it from a CD-ROM or a floppy disk into the image forming apparatus or after downloading it from a LAN or a communications channel into the image forming apparatus.

As described above, a copying apparatus includes first document feeding means for transporting a plurality of documents stacked on a document tray to a document platen, one by one, in the order of pages, the first page first, second document feeding means for transporting a plurality of documents stacked on the document tray to the document platen, one by one, in the reverse order of pages, the last page first, and first setting means for setting either a mode in which a recording paper is discharged face-down or a mode in which a recording paper is discharged face-up, wherein the recording paper is fed by either the first document feeding means or the second document feeding means depending on the mode set in the first setting means. The copying apparatus thus discharges the recording papers either face-up or face-down depending on the preference of the user. In either case, the order of the pages of the recording papers is not reversed.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A copying apparatus comprising:

first document feeding means for feeding a plurality of original documents stacked on a document tray to a document platen, one by one sequentially, the top page first;

second document feeding means for feeding a plurality of original documents stacked on the document tray to the document platen, one by one sequentially in reverse order, the bottom page first;

copying means for copying the original document fed to the document platen onto a recording sheet;

first setting means for setting one of a face-down mode in which the recording sheet is discharged face-down and a face-up mode in which the recording sheet is discharged face-up; and control means for controlling said first document feeding means and said second document feeding means, said control means causing one of said first document feeding means and said second document feeding means to feed the document, in accordance with the mode set by said first setting means.

2. A copying apparatus according to claim 1, wherein said first document feeding means feeds sequentially documents stacked face-up in the document tray, on a topmost-document-first basis, and said second document feeding means feeds sequentially documents stacked face-up in the document tray, on a bottommost-document-first basis.

3. A copying apparatus according to claim 1, wherein said control means causes said first document feeding means to feed the documents in accordance with the face-down mode set by said first setting means, and causes said second document feeding means to feed the documents in accordance with the face-up mode set by said first setting means.

4. A copying apparatus according to claim 1, further comprising:

inverting means for inverting to a topside down orientation a recording sheet onto which said copying means has copied the original document; and second setting means for setting one of a single side mode in which copying is made on a single side of the recording sheet and a duplex mode in which copying is made on both sides of the recording sheet, wherein said control means controls said inverting means in accordance with the modes set by said first setting means and said second setting means.

5. A copying apparatus according to claim 4, wherein said control means activates said inverting means, in accordance with the face-down mode set by said first setting means and the single side mode set by said second setting means;

said control means deactivates said inverting means, in accordance with the face-down mode set by said first setting means and the duplex mode set by said second setting means;

said control means deactivates said inverting means, in accordance with the face-up mode set by said first setting means and the single side mode set by said second setting means; and said control means activates said inverting means, in accordance with the face-up mode set by said first setting means and the duplex mode set by said second setting means.

6. A control method of a copying apparatus comprising (a) first document feeding means for feeding a plurality of original documents stacked on a document tray to a document platen, one by one sequentially, the top page first, (b) second document feeding means for feeding a plurality of original documents stacked on the document tray to the document platen, one by one sequentially, in the reverse order, the bottom page first, and (c) copying means for copying an original document brought to the document platen onto a recording sheet, and wherein the copying apparatus is operable in at least a face-down mode for discharging the recording sheet face-down and a face-up mode for discharging the recording sheet face-up, said control method comprising the steps of:

determining which of the face-down mode and the face-up mode is set; and feeding the original document by either of the first document feeding means or the second document feeding means, in accordance with the determined mode.

7. A control method of a copying apparatus according to claim 6, wherein the first document feeding means feeds sequentially original documents stacked face-up in the document tray, on a topmost-document-first basis, and the second document feeding means feeds sequentially original documents stacked face-up in the document tray, on a bottommost-document-first basis.

8. A control method of a copying apparatus according to claim 6, further comprising the step of causing the first document feeding means to feed the original documents in accordance with the face-down mode set, and causing the second document feeding means to feed the original documents in accordance with the face-up mode set.

9. A control method of a copying apparatus according to claim 6, wherein the copying apparatus further comprises inverting means for inverting, the topside down, a recording sheet to which the copying means copies the document, and wherein the copying apparatus is further operable in a single side mode in which copying is made on a single side of the recording sheet, or a duplex mode in which copying is made on both sides of the recording sheet, said control method further comprising the steps of:

determining which of the single side mode and duplex mode is set, the mode in which copying is made on a single side of the recording sheet or the mode in which copying is made on both sides of the recording sheet; and controlling the inverting means as to whether to invert the recording sheet, depending on the face-down mode, the face-up mode, the single side mode and the duplex mode.

10. A control method of a copying machine according to claim 9, further comprising the steps of:

discharging the recording sheet with the side inverted by the inverting means, in accordance with the face-down mode and the side mode set;

discharging the recording sheet with the side not inverted by the inverting means, in accordance with the face-down mode and the duplex mode set;

discharging the recording sheet with the side not inverted by the inverting means, in accordance with the face-up mode and the single side mode set; and discharging the recording sheet with the side inverted by the inverting means, in accordance with the face-up mode and the duplex mode set.

11. A photocopying machine comprising:

first document feeding means for feeding a plurality of original documents stacked on a document tray to a document platen, one by one sequentially, the top page first;

second document feeding means for feeding a plurality of original documents stacked on the document tray to the document platen, one by one sequentially in reverse order, the bottom page first;

copying means for copying an original document onto a recording sheet;

inverting means for inverting, the top side down, the recording sheet copied by the copying means; and an operation panel for setting either a mode in which the recording sheet is discharged face-down or a mode in which the recording sheet is discharged face-up.

12. A control method of a copying apparatus comprising the steps of:

a first feeding step of feeding a plurality of original documents stacked on a document tray to a document platen, one by one sequentially, the top page first;

a second feeding step of feeding a plurality of original documents stacked on the document tray to the document platen, one by one sequentially in reverse order, the bottom page first;

copying the original document fed to the document platen onto a recording sheet;

setting one of a face-down mode in which the recording sheet is discharged face-down and a face-up mode in which the recording sheet is discharged face-up; and controlling said first feeding step and said second feeding step to cause one of said first feeding step and said second feeding step to feed the document, in accordance with the mode set by said setting step.

13. A control method according to claim 12, wherein said first feeding step feeds sequentially documents stacked face-up in the document tray, on a topmost-document-first basis, and said second feeding step feeds sequentially documents stacked face-up in the document tray, on a bottommost-document-first basis.

14. A control method according to claim 12, wherein said first feeding step is controlled to feed the documents in accordance with the face-down mode, and said second feeding step is controlled to feed the documents in accordance with the face-up mode.

15. A control method according to claim 12, further comprising the step of:

inverting to a topside down orientation a recording sheet onto which the original document has been copied; and a second setting step setting one of a single side mode in which copying is made on a single side of the recording sheet and a duplex mode in which copying is made on both sides of the recording sheet, wherein said inverting step is controlled in accordance with the modes set in the first setting step and the second setting step.

16. A control method according to claim 15, wherein said inverting step is controlled in accordance with the face-down mode set in the first setting step and the single side mode set in the second setting step;

said inverting step is deactivated in accordance with the face-down mode set in the first setting step and the duplex mode set in the second setting step;

said inverting step is deactivated in accordance with the face-up mode set in the first setting step and the single side mode set in the second setting step; and said inverting step is activated in accordance with the face-up mode set in the first setting step and the duplex mode set in the second setting step.

* * * * *

UNITED STATES PATENT AND TRADEMARK OFFICE
CERTIFICATE OF CORRECTION

PATENT NO. : 6,226,473 B1  Page 1 of 1
DATED : May 1, 2001
INVENTOR(S) : Satoru Kutsuwada It is certified that error appears in the above-identified patent and that said Letters Patent is hereby corrected as shown below:

Title page,
Item [56], RC: FOREIGN PATENT DOCUMENTS, "9/104143" should read
-- 9-104143 --.

Item [57], ABSTRACT,
Line 9, "a" should read -- an --.

Column 2,
Line 33, "an" should read -- a --.

Column 4,
Line 43, "(imageformed)" should read -- (image-formed) --.

Column 5,
Line 35, "(step SI)." should read -- (step S1). --.
Line 38, "Si" should read -- S1 --.
Line 55, "Si" should read -- S1 --.

Column 8,
Line 26, "the" should read -- the single --.

Signed and Sealed this

Twenty-second Day of January, 2002

Attest:

*Attesting Officer*

JAMES E. ROGAN
*Director of the United States Patent and Trademark Office*